United States Patent Office 2,793,229
Patented May 21, 1957

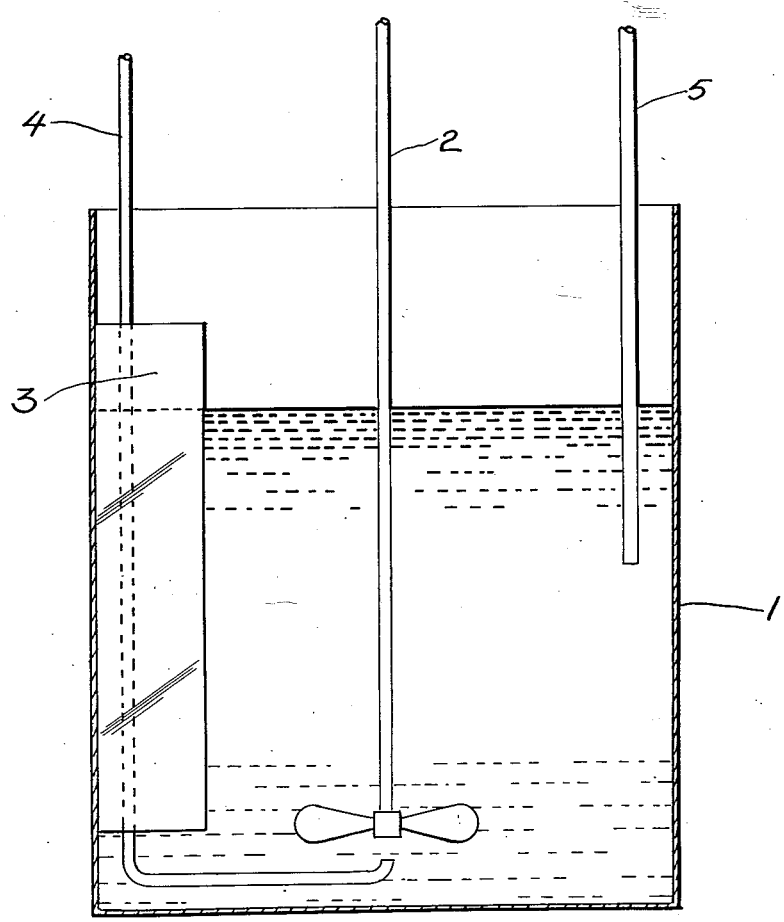

2,793,229

PROCESS FOR THE PRODUCTION OF OXY-
ALKANE SULFONIC ACIDS AND THEIR
SALTS

Bruno Blaser, Dusseldorf-Urdenbach, and Hermann Haas, Dusseldorf-Holthausen, Germany, and Johann Heinrich Helberger, San Miguel de Tucuman, Argentina, assignors to Böhme Fettchemie G. m. b. H., Dusseldorf, Germany, a corporation of Germany Application July 6, 1954, Serial No. 441,302

(Filed under Rule 47(a) and 35 U. S. C. 116)

Claims priority, application Germany July 3, 1953

6 Claims. (Cl. 260—513)

This invention relates to a process for producing oxyalkane sulfonic acids and their salts, and more particularly to a process for making such compounds from unsaturated aliphatic alcohols having more than three carbon atoms in their molecules.

The prior art shows that salts of 3-oxypropane-1-sulfonic acid can be formed by an addition reaction of sodium- or potassium-bisulfite with allylalcohol. However, this reaction requires a considerable amount of time, and even after several hours of boiling the reaction mixture the reaction does not go to completion, so that the yields are very poor. These low yields are further reduced as the number of carbon atoms in the chain of the alcohol increases.

It is therefore an object of the present invention to provide a process for the production of oxyalkane sulfonic acids and their salts from long-chain unsaturated alcohols which will produce good yields.

Another object of this invention is to provide a process for the production of long-chain, high-molecular oxyalkane sulfonic acids and their salts which produces good yields in a considerably shorter time than the processes of the prior art.

Other objects and advantages will become apparent as the description of the invention proceeds.

We have found that high-molecular oxyalkane sulfonic acids can be produced with very good yields by reacting a high-molecular, unsaturated aliphatic alcohol having more than three carbon atoms in its molecule with neutral or weakly alkaline solutions of sulfurous acid salts in the presence of finely divided and finely distributed oxygen, oxygen-containing gases or oxygen-yielding substances.

The sulfurous acid salts which may advantageously be used in the process in accordance with our invention include primarily the alkali metal salts as well as the ammonium salts.

Oxygen-containing gases which may be used in our process include air and any other mixture of oxygen with more or less inert gases.

Oxygen-yielding substances which may advantageously be employed in carrying out our process are, for example, peroxides or compounds having an oxidizing effect.

An important condition of our process is that the oxygen, oxygen-containing gas or the oxygen-yielding substance be finely divided and finely and uniformly distributed throughout the reaction mass during the entire reaction period. The degree and method of optimum division and distribution can be determined by trial and error for each class of compounds in the reaction mixture. The yield will vary for different materials, with the amount and fineness of distribution of the oxygen or oxygen-yielding material.

We have further found that the best results are obtained if, at the beginning of the reaction, only the stoichiometric amount of sulfurous acid salt or slightly less is provided and the unsaturated alcohol is slowly added thereto while simultaneously adding more sulfurous acid salt until the amount of sulfurous acid salt in the reaction mixture exceeds the stoichiometric amount by about 20 to 69%.

The reaction in accordance with our invention can be carried out in a number of different known types of equipment. The attached drawing shows schematically, for the purpose of illustration only, an apparatus which has been found to be particularly well adapted for practicing our invention. It will be understood, however, that various modifications and changes can be made therein without departing from the scope of our invention.

The apparatus shown by way of example in the attached drawing comprises a container 1, a high-speed stirrer 2, one or more baffle plates 3, a fluid supply line 4, and a fluid supply line 5.

The vessel is first supplied with the stoichiometric amount, or slightly less, of bisulfite. Subsequently, the stirrer is set in motion at a relatively high speed, for example 1500 r. p. m., and simultaneously air or oxygen-containing gases or fluids are passed through fluid supply line 4, and the feeding of the unsaturated alcohol into the reaction mixture through the fluid supply line 5 is begun. The baffle plates 3 serve to aid in producing a thoroughly intimate admixture of the reactants.

The process in accordance with our invention is preferably carried out at a temperature below 100° C., but the reaction also takes place readily within a wide range of higher temperatures as well as elevated pressures.

The mechanics of the reaction between the bisulfite and the unsaturated aliphatic alcohol in the presence of a finely divided and distributed oxiding gas are as follows:

The bisulfite radical attaches itself to the alcohol molecule at the double bond, whereby the pH-value of the reaction solution is shifted toward the alkaline side. The reaction takes place most efficiently at a pH-value of 7 to 8, so that in order to maintain that value a small amount of acid must be continuously added. Acids which may be used for this purpose are mineral acids, such as, for example, dilute sulfuric acid. The use of dilute sulfuric acid is particularly advantageous because a portion of the bisulfite will be oxidized to the sulfate in the strongly oxidizing reaction medium. However, other acids may also be used, but the most practical acid is a bisulfite solution or sulfur dioxide.

High-molecular unsaturated aliphatic alcohols with the double bond at the extreme end of the carbon chain have been found to react particularly smoothly with the bisulfite to form the corresponding oxyalkane sulfonic acids and their salts. However, other unsaturated aliphatic alcohols having at least four carbon atoms in their molecule are also suitable for the process in accordance with our invention. Thus, $\alpha$-$\beta$-unsaturated alcohols, such as crotonylalcohol, pentene-3,4-ol-2 and the like, as well as β,γ-unsaturated alcohols, such as allylcarbinol, dimethylallylcarbinol, diethylallylcarbinol, methylpropylallylcarbinol and the like, and pentene-4,5-ol-2 and pentene-4,5-ol-1, are suitable as the oxyalkene starting materials.

It is well known that the solubility of unsaturated alcohols in water decreases with increasing length of the carbon chain. Therefore, in order to obtain a thorough admixture of the reactants it may be necessary to add certain agents which promote the solubility of the long-chain unsaturated alcohols in water. Examples of such agents are low-molecular alcohols such as, for example, methanol.

The addition reaction between the bisulfite and the unsaturated alcohol takes place very rapidly and goes to completion a short time after the alcohol is added to the bisulfite solution, provided the above-described conditions and quantitative relationships are substantially maintained during the reaction.

Upon completion of the reaction the solution can be treated in a manner selected from a number of well-known ways to recover the desired reaction product. For example, the solution is evaporated to a certain volume and concentration, whereupon the undesirable inorganic salts are precipitated out by the addition of alcohol and then filtered off. The filtrate is then further evaporated to dryness The salts of the desired oxyalkane sulfonic acids are thereby recovered in sufficiently pure form to be subjected to further refining treatments.

The oxyalkane sulfonic acids and their salts produced in accordance with our invention have a number of valuable uses. They have been found to possess a certain amount of surface-active properties. Moreover, they are important intermediate products in the production of surface-active compounds, textile- and leather-treating agents, disinfectants, pest-control agents, and the like. The high-molecular oxyalkane sulfonic acids produced in accordance with this invention are also suitable as intermediate products in the preparation of sultones.

The following examples will further illustrate our invention and enable persons skilled in the art to understand it better. However, it should be understood that the examples below are given only for the purpose of illustration and are not intended to limit the invention to their terms and conditions.

*Example I*

192 gm. sulfur dioxide were passed into a solution of 160 gm. sodium hydroxide in 700 cc. water, and the resulting solution of sodium bisulfite was diluted to 1100 cc. 200 cc. of this bisulfite solution were mixed with 1500 cc. water and then neutralized with dilute sodium hydroxide. A stream of air was then passed into the neutralized solution at the rate of 2 liters per minute while vigorously agitating the solution. Simultaneously, 144 gm. crotonylalcohol and the remainder of the bisulfite solution were added dropwise over a period of 1½ hours. The pH-value of the reaction solution was maintained substantially at neutral, i. e. at about 7 or 8, by adding small amounts of dilute sulfuric acid or dilute sodium hydroxide, depending upon whether the adjustment to neutral had to be made from the alkaline side or the acid side. The agitation was continued for 10 minutes after the addition of alcohol and bisulfite was completed. The resulting clear solution was treated with sulfuric acid until the sulfite was completely oxidized to the sulfate. The solution was then evaporated until the majority of the sulfate had precipitated out, and the solution was then neutralized with sodium hydroxide. Alcohol was then added to the evaporated neutral solution in an amount corresponding to half the volume of the solution. After standing for some time a precipitate was formed. The solution was then filtered and the filter cake was washed with a 75% solution of alcohol. The filtrate was evaporated to dryness, whereby the sodium salt of 4-oxybutane-2-sulfonic acid was recovered in a very pure form with a remarkably good yield. The free acid was obtained by treatment of the sodium salt in any one of the well-known manners; for example, by acidification thereof.

*Example II*

192 gm. sulfur dioxide were passed into a solution of 160 gm. sodium hydroxide in 700 cc. water. The resulting sodium bisulfite solution was diluted to 1100 cc. 200 cc. of this dilute bisulfite solution were added to 1500 cc. water and then neutralized with dilute sodium hydroxide. A stream of air was then passed into the neutralized solution at the rate of about 2 liters per minute, accompanied by vigorous agitation. Simultaneously with the passage of air through the solution and the agitation, 144 gm. of allylcarbinol and the remainder of the bisulfite solution were added dropwise over a period of 1½ hours. During this period the pH-value of the reaction mass was maintained substantially at neutral by the addition of small amounts of dilute sulfuric acid or sodium hydroxide, depending upon whether the solution tended to turn alkaline or acid. The vigorous agitation was continued for 10 minutes after the addition of the alcohol and the bisulfite solution was completed. The clear solution thus obtained was then treated in the manner described in Example I. The sodium salt of 4-oxybutane-1-sulfonic acid was recovered as a pure white solid and in virtually quantitative yields. The free acid was obtained by treatment of the sodium salt in any one of the well-known manners; for example, by acidification thereof.

While we have disclosed certain embodiments of our invention, we wish it to be understood that certain modifications and changes may be made therein without departing from the spirit of our invention or the scope of the following claims.

We claim:

1. In a process of producing oxyalkane sulfonic acid salts from olefinic alcohols having 4 to 5 carbon atoms in the alkene chain and a water-soluble salt of sulfurous acid in the presence of an oxidizing substance selected from the group consisting of oxygen, oxygen-containing gas mixtures and oxygen-yielding peroxides, while vigorously agitating the reaction mixture, the steps comprising providing an aqueous solution of about the stoichiometric amount of the sulfurous acid salt necessary for said reaction, said solution having said oxidizing substance homogeneously distributed therethrough in a finely divided state, adding the olefinic alcohol to the solution within a period of 1 to 2 hours while introducing additional sulfurous acid salt to maintain an excess of 20 to 60% of sulfurous acid salt in the reaction mixture, and maintaining the pH of the reaction mixture at a value from 7 to 8 throughout said period.

2. In a process of producing 4-oxybutane-2-sodium sulfonate from crotonylalcohol and sodium bisulfite in the presence of air while vigorously agitating the reactants, the steps comprising providing an aqueous solution of substantially the stoichiometric amount of sodium bisulfite needed for the reaction, said solution having the air homogeneously distributed therethrough in a finely divided state, adding the crotonylalcohol to the solution within a period of 1 to 2 hours while introducing additional sodium bisulfite to maintain an excess of 20 to 60% sodium bisulfite in the reaction mixture, and maintaining the pH of the reaction mixture at a value from 7 to 8 throughout said period.

3. In a process of producing 4-oxybutane-1-sodium sulfonate from allylcarbinol and sodium bisulfite in the presence of air while vigorously stirring the reactants, the steps comprising providing an aqueous solution of substantially the stoichiometric amount of sodium bisulfite needed for the reaction, said solution having the air homogeneously distributed therethrough in a finely divided state, adding the allylcarbinol to the solution within a period of 1 to 2 hours while introducing additional sodium bisulfite to maintain an excess of 20 to 60% sodium bisulfite in the reaction mixture, and maintaining the pH of the reaction mixture at a value from 7 to 8 throughout said period.

4. A process as in claim 1, wherein the reaction takes place in the presence of substances capable of promoting the solubility of olefinic alcohols with 4 to 5 carbon atoms in the alkene chain in water.

5. A process as in claim 4, wherein said substance is a lower-molecular saturated aliphatic alcohol.

6. A process as in claim 5, wherein said alcohol is methanol.

References Cited in the file of this patent

UNITED STATES PATENTS

| | | |
|---|---|---|
| 2,504,411 | Harman | Apr. 18, 1950 |
| 2,653,970 | Fessler | Sept. 29, 1953 |

OTHER REFERENCES

Kharasch et al.: J. Org. Chem., vol. 3, pp. 175–192.